UNITED STATES PATENT OFFICE.

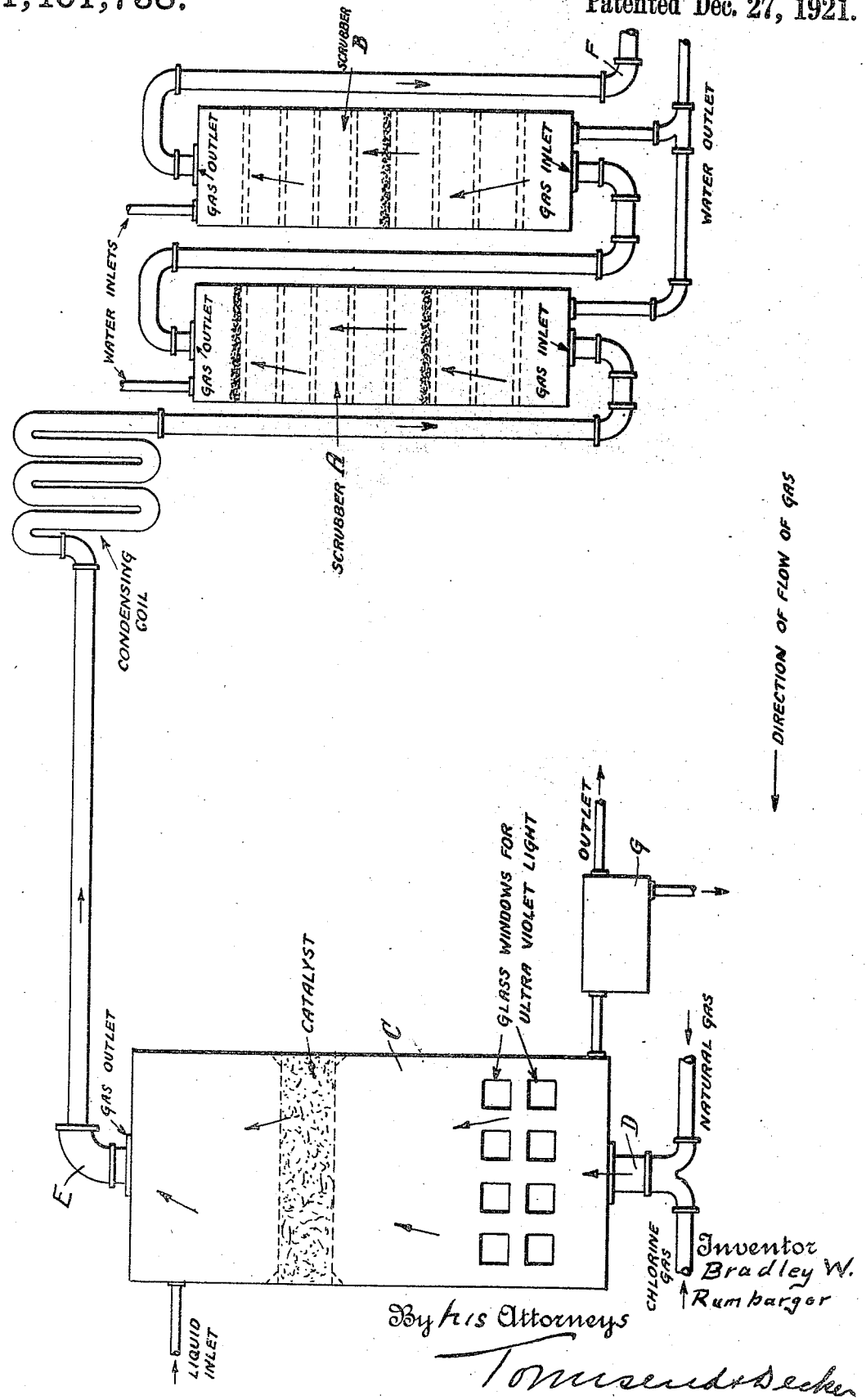

BRADLEY W. RUMBARGER, OF FAIRBANKS, LOUISIANA, ASSIGNOR TO SOUTHERN CARBON COMPANY, OF FAIRBANKS, LOUISIANA, A CORPORATION OF DELAWARE.

METHOD OF PRODUCING CARBON-BLACK.

1,401,738.

Specification of Letters Patent. Patented Dec. 27, 1921.

Application filed March 9, 1921. Serial No. 451,014.

*To all whom it may concern:*

Be it known that I, BRADLEY W. RUMBARGER, a citizen of the United States, and a resident of Fairbanks, in the parish of Ouachita and State of Louisiana, have invented certain new and useful Improvements in Methods of Producing Carbon-Black, of which the following is a specification.

My invention relates to the manufacture of hydrocarbon gas especially suitable for use in the burner of an apparatus for producing carbon black by combustion of said gas or for other uses.

The object of the invention is to obtain from hydrocarbon gas a gas of diminished hydrogen and of augmented carbon content and also to produce at the same time hydrochloric acid gas and other by-products such for instance as chloroform.

A further object of the invention is to increase the output of carbon black from the carbon black apparatus resulting from the burning of the hydrocarbon gas beyond that which it is possible to secure by the use of the hydrocarbon gas heretofore employed and particularly beyond the output resulting from the burning of a natural hydrocarbon gas as heretofore practised in the art.

This result is attained according to my present invention by reducing the hydrogen content of the gas to be burned, thereby giving a cooler flame so that the carbon element will not be as readily consumed at the burner.

To further enhance the desired effect of depositing carbon black at the burner, my invention provides for enriching the gas as to its carbon content while also diminishing the hydrogen content for the purpose stated.

To carry out my invention: chlorin, a hydrocarbon gas preferably natural gas and a liquid hydrocarbon preferably a mineral oil or derivative thereof, such as fuel oil, gasolene, crude oil, kerosene, mineral seal oil, etc., are brought together in a suitable chlorinating chamber, preferably one provided with a catalyst and with means for exposing the contents of the chamber to the rays of an ultra-violet lamp, the chemical reaction resulting in the production of hydrochloric acid gas which is released by the substitution of the chlorin or the combination of the chlorin with the hydrogen element of the natural gas and the liquid hydrocarbon, while at the same time part of the carbon element of the liquid hydrocarbon (which has been partly robbed of its hydrogen element by the action of the chlorin thereby freeing part of the carbon) is picked up with the gaseous hydrocarbon (which has also been partially robbed of its hydrogen element). As will be seen, the practical result is a derivation of a hydrocarbon gas leaner as to its hydrogen element and richer as to its carbon element than the gas introduced, together with the production of hydrochloric acid gas. These two gases, to wit: the carbon enriched hydrocarbon or natural gas partially robbed of its hydrogen and the hydrochloric acid gas are taken from the chlorinating chamber through suitable washing towers or scrubbers where the hydrochloric acid gas is washed out and converted into hydrochloric acid, leaving the hydrocarbon gas enriched in carbon and diminished as to its hydrogen content to proceed to the standard carbon black manufacturing plant in a state ready for converting to carbon black by burning the same, or to be used for any other desired purpose where a hydrocarbon gas less in hydrogen content and richer in carbon content than that introduced into the converting apparatus may be desired or required.

The accompanying drawings show in side elevation apparatus of typical form that may be employed in carrying out my invention.

C indicates a chlorinating chamber of any suitable form or construction preferably provided with a catalyst such as charcoal and glass windows for ultra-violet light as indicated, through which chamber the liquid hydrocarbon may be circulated, being taken in at the liquid inlet and drawn out by the liquid outlet in constant circulation to which the liquid hydrocarbon may be supplied or added as the amount diminishes under the actions taking place in the chlorinating chamber.

D is the inlet through which chlorin gas and hydrocarbon gas may be introduced into the chlorinating chamber and caused to pass through the liquid hydrocarbon while E is the outlet for the resultant gases. The hydrochloric acid gas and the hydrocarbon gas resulting from the action in the chlorinating chamber as already described pass from the outlet E preferably through a suitable condensing coil and then through one or more scrubbers marked A and B of any particular or suitable form for removal of the hydrochloric acid gas and conversion thereof into hydrochloric acid, leaving the hydrocarbon gas of increased carbon content and diminished hydrogen content, which passes by way of the outlet F, for any desired uses as for instance the production of carbon black by burning the same in a gas black plant. The relative amounts of chlorin gas and hydrocarbon gas introduced into the chlorinating chamber may be regulated in any desired manner, as for instance by using a liquid chlorin supply tank of any desired form known in the art.

I do not limit myself to the use of any particular hydrocarbon gas but find in practice that good results are obtained from the use of the natural gas obtained from the ground at Fairbanks, Louisiana, and consisting of 90% methane $CH_4$, 7% ethane $C_2H_6$, 2.5% nitrogen N and 0.5% carbon dioxid $CO_2$. This gas I have used as obtained from the ordinary gasolene plant employed for obtaining the gasolene from the natural gas in conjunction with mineral seal oil.

Using a hydrocarbon gas of about the above constitution I find in practice that good results may be obtained by supplying about one pound of chlorin for passage as gas to the chlorinator to one thousand feet of the natural gas. When the gas is treated as described and burned in the gas black plant I am enabled to obtain greatly increased quantities of gas black over what can be obtained from the natural gas untreated. The enhanced output of the carbon black is probably due in a greater or less part to the fact that the treatment of the natural or other gas prior to burning by removing therefrom part of the hydrogen element gives a much cooler flame in a carbon black plant, so that the carbon element will not be consumed as rapidly when the gas is burned to produce the carbon black and is also due to a greater or less extent to the enrichment of the natural or other gas as to its carbon element.

In the actions described as resulting from bringing the hydrocarbon gas and the chlorin together in the chlorinating chamber, chloroform is produced by the constant action of the chlorin and this may be recovered as a by-product in any suitable form of trap introduced as indicated at G in the liquid circulation of the liquid hydrocarbon.

The appearance of the flame at the burner may be used as an indication whether the best amount of chlorin for the particular hydrocarbon gas introduced therewith is being used. A flame showing a greenish tinge would indicate the presence of chlorin in the resultant gas and would indicate that the relative amount of chlorin passed into the chlorinator should be reduced. On the other hand should the production of black fall off an increase in the relative amount of chlorin introduced into the chlorinator with the hydrocarbon gas would be indicated.

It will therefore be understood that the invention is not limited to the particular proportions of chlorin and hydrocarbon gas above stated but the same would vary to some extent with the particular natural or other hydrocarbon gas subjected to the treatment and also probably to some extent upon the particular hydrocarbon liquid used in the chlorinator.

What I claim as my invention is:—

1. The process of treating a natural hydrocarbon gas to diminish the hydrogen content and increase the carbon content thereof, consisting in bringing said gas, chlorin and liquid hydrocarbon together in a chlorinating chamber.

2. The process of treating a natural hydrocarbon gas to increase the carbon content and to diminish the hydrogen content thereof and at the same time produce hydrochloric acid gas, consisting in bringing said natural gas, chlorin and a liquid hydrocarbon together in a chlorinating chamber, washing out the hydrochloric acid gas and passing the remaining gas on for use as hydrocarbon gas having an increased carbon content.

3. The process of obtaining from a hydrocarbon gas a gas enriched in carbon and of diminished hydrogen content together with hydrochloric acid gas, consisting in bringing said hydrocarbon gas, a liquid hydrocarbon and chlorin together in a chlorinating chamber, washing out the hydrochloric acid gas and passing the remaining gas on for use as hydrocarbon gas having an increased carbon content.

4. The method of increasing the output of carbon black derived from the burning of hydrocarbon gas, consisting in diminishing the hydrogen content of said gas and then burning said gas to produce the carbon black.

5. The method of increasing the output of carbon black derived from the burning of a natural hydrocarbon gas, consisting in reducing the hydrogen content thereof, and then burning said gas to produce carbon black.

6. The method of increasing the output of carbon black derived from a natural hydrocarbon gas, consisting in reducing the hydrogen content and increasing or augmenting the carbon content thereof and then burning said gas to produce carbon black.

7. The method of enriching a hydrocarbon gas by increasing the carbon content thereof, consisting in bringing said gas and liquid hydrocarbon together in a chlorinating chamber supplied with chlorin.

8. The method of increasing the output of carbon black derived from a natural hydrocarbon gas and producing as by-products hydrochloric acid and chloroform, consisting in subjecting the said gas to the action of chlorin in a chlorinating chamber, removing the hydrochloric acid and chloroform and burning the remaining gas to produce carbon black.

Signed at New York, in the county of New York and State of New York, this 23rd day of February, A. D. 1921.

BRADLEY W. RUMBARGER.

Witness:
W. R. WARNER.